United States Patent [19]

Riano

[11] 4,154,399
[45] May 15, 1979

[54] SULPHUR BURNER GUN NOZZLE

[76] Inventor: Marcos D. Riano, 5803 Hartman Ave., Bakersfield, Calif. 93309

[21] Appl. No.: 855,197

[22] Filed: Nov. 28, 1977

[51] Int. Cl.² ........................... B05B 1/24; B05B 1/34
[52] U.S. Cl. ................... 239/139; 239/465; 239/492
[58] Field of Search ..................... 239/132–132.3, 239/135, 139, 463, 472, 473, 490–497, 391, 396, 436, 443, 444, 465, 476, 477, 569; 23/274, 278

[56] References Cited

U.S. PATENT DOCUMENTS 1,844,653  2/1932  Hechenbleikner ............... 239/139 X

FOREIGN PATENT DOCUMENTS

| | | | |
|---|---|---|---|
| 100473 | 5/1916 | United Kingdom | 239/492 |
| 117884 | 8/1918 | United Kingdom | 239/497 |
| 624999 | 6/1949 | United Kingdom | 239/493 |
| 789252 | 1/1958 | United Kingdom | 239/491 |

Primary Examiner—Robert B. Reeves
Assistant Examiner—Andres Kashnikow
Attorney, Agent, or Firm—Edgar W. Averill, Jr.

[57] ABSTRACT

A nozzle for spraying molten sulphur to be burned. The nozzle has a generally cylindrical body with a threaded axial bore. A diffusion chamber, a diversion cone and at least two openings are located within the nozzle. At least two tangential passageways connect the openings with a swirl chamber and a nozzle tip is positioned adjacent to the swirl chamber.

8 Claims, 8 Drawing Figures

U.S. Patent  May 15, 1979  4,154,399
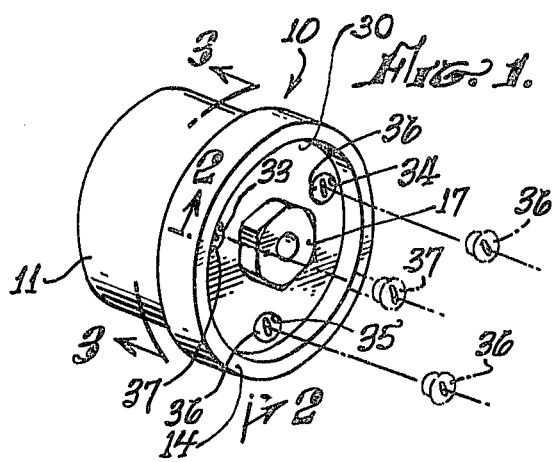
Fig. 1.
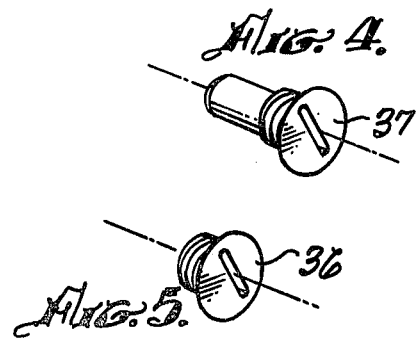
Fig. 4.
Fig. 5.
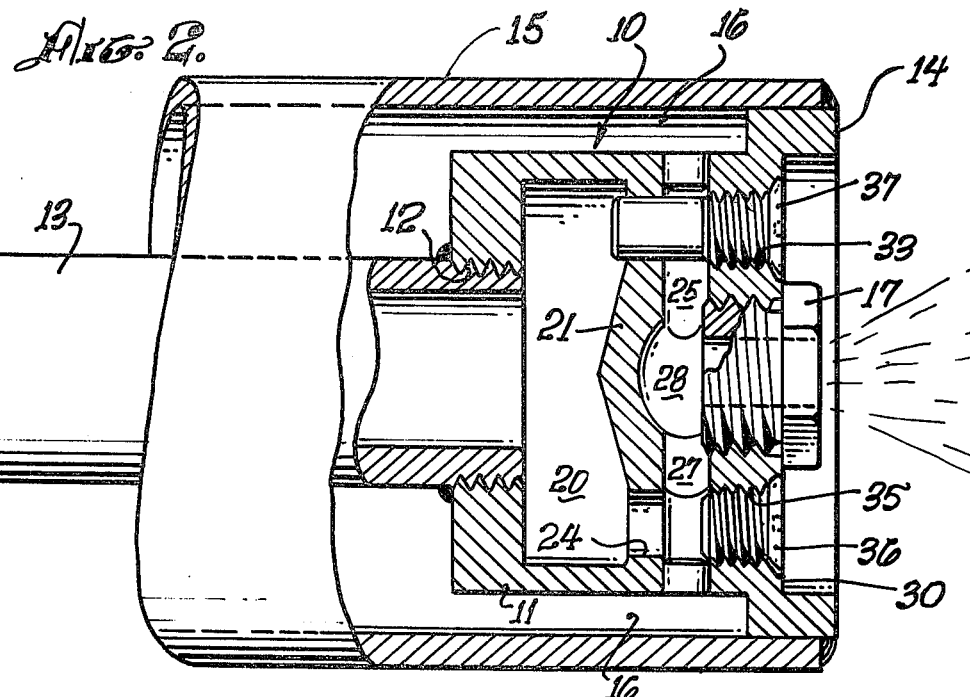
Fig. 2.
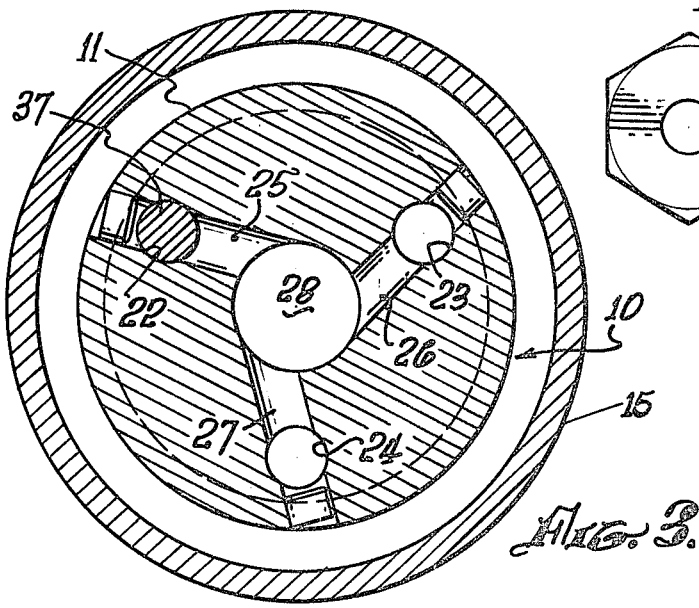
Fig. 3.
Fig. 6.
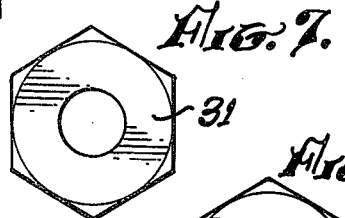
Fig. 7.
Fig. 8.

SULPHUR BURNER GUN NOZZLE

BACKGROUND OF THE INVENTION

The field of the invention is nozzles capable of operating at high temperatures for the spraying of viscous liquids. The invention more particularly relates to nozzles useful at the tip of a sulphur gun of the type utilized to burn sulphur to manufacture sulphuric acid.

Sulphuric acid is typically made by pumping and burning molten sulphur in a brick lined furnace. In order to insure a complete combustion of the sulphur, the sulphur must be broken into a fine spray which essentially atomizes or vaporizes the sulphur in the sulphur furnace. If the sulphur is not sufficiently atomized it will not be completely burned and will be likely to contact the wall of the furnace or the boiler tubes therein thereby degrading the furnace wall and corroding the tubes in addition to affecting very seriously the boiler efficiency.

There has been a trend in sulphuric acid plants to increase the size of the sulphur burner to enable economic operation. Therefore there is a need for a high volume sulphur gun capable of use by even the largest plants. Production from a typical large volume plant is about one thousand eight hundred (1800) tons per day. Because of the large volume operation of most newer sulphur acid plants, these plants operate with furnaces having three separate sulphur guns to provide the necessary production volume. The use of multiple guns permits the operation of the plant at several production volumes and if the need for sulphuric acid decreases, one or more of the guns may be shut down. This avoids the expense of intermittent operation of the plant but even so, it is more costly, starting with the initial design of the plant, right down to normal maintenance after it is under normal operation, because design, construction, operation and maintenance have to be provided for three pieces of equipment instead of for only one.

Presently used sulphur guns are exposed to the high temperature of the burning sulphur which results in a degradation of the nozzle, often resulting in a stripping of the threads of the gun or nozzle, or both. The heat within the furnace often exceeds two thousand degrees (2000°) Fahrenheit. When the furnace is first shut down the nozzle is not cooled by the sulphur passing through it and therefore the nozzle reaches a high temperature and present nozzles are not able to withstand such temperatures for any extended period of time.

SUMMARY OF THE INVENTION

It is an object of the present invention to provide a sulphur gun nozzle having long life, high production volume and adjustability of production.

The present invention is for a nozzle for spraying molten sulphur. The nozzle has a generally cylindrical body with a threaded axial bore for introducing molten sulphur into the nozzle. A diffusion chamber is located adjacent the threaded axial bore and a diversion cone is positioned along the axis of the nozzle adjacent the diffusion chamber. At least two openings pass through the diversion cone and a tangential passageway is connected to each opening which leads the molten sulphur to a swirl chamber. The swirl chamber is circular and positioned adjacent the diversion cone. A nozzle tip is positioned axially over the swirl chamber and the nozzle body is protected axially by a steam chamber extending a majority of the length of the nozzle.

BRIEF DESCRIPTION OF THE DRAWINGS

FIG. 1 is a perspective view of the nozzle of the present invention.

FIG. 2 is a cross-sectional view taken along line 2—2 of FIG. 1 further including a steam jacket and molten sulphur feed line.

FIG. 3 is a cross-sectional view taken along lines 3—3 of FIG. 1.

FIG. 4 is a perspective view of a threaded plug useful with the nozzle of FIG. 1.

FIG. 5 is a perspective view of a threaded screw useful with the nozzle of FIG. 1.

FIG. 6 is a side elevation of a nozzle tip useful with the nozzle of FIG. 1.

FIG. 7 is a side elevation of a nozzle tip useful with the nozzle of FIG. 1.

FIG. 8 is a side elevation of a nozzle tip useful with the nozzle of FIG. 1.

DESCRIPTION OF THE PREFERRED EMBODIMENTS

The sulphur gun of the present invention is shown in perspective view in FIG. 1 and indicated generally by reference character 10. The body of the nozzle is fabricated from stainless steel such as alloy 20 stainless steel, although 316 stainless may alternatively be used. The body of the nozzle has a cylindrical side 11 and has a threaded opening 12 shown in FIG. 2, into which a pipe 13 is secured for passage of molten sulphur into the nozzle. Part 13 is preferably welded to nozzle 10 in order to prevent any possibility of sulphur leakage.

An integral ring 14 is positioned along the front edge of the cylindrical side 11. Ring 14 extends both outwardly from the face of the nozzle and outwardly from the side of the nozzle. The side extension permits the attachment of a steam jacket 15 which results in a steam chamber 16 being positioned along a majority of the side of the nozzle. The steam serves both to heat the nozzle for start up purposes and also to cool the nozzle during operation and after the gun has been shut down. Ring 14 also extends outwardly from the front of the nozzle as shown best in FIG. 2. This outward extension serves to protect the nozzle tip 17. It is common to drain the molten sulphur out of the gun immediately after the furnace is shut down, and this is typically accomplished by pulling the gun out of the burner. The nozzle tip is often damaged in this operation, which damage potential is greatly reduced by the presence of ring 14.

The internal construction of the nozzle is shown best in FIGS. 2 and 3. The molten sulphur entering the nozzle from pipe 13 enters a diffusion chamber 20. The sulphur next contacts a diversion cone 21 which is positioned axially adjacent the diffusion chamber. The diversion cone 21 has three openings, 22, 23 and 24, shown best in FIG. 3. Each opening has a tangential passageway, 25, 26 and 27. Eacn tangential passageway leads to swirl chamber 28, which is also positioned axially in the nozzle. A nozzle tip 17 is screwed into a threaded opening located in the face 30 of the nozzle. Nozzle tips of various sizes may be utilized with the nozzle of the present invention and such nozzle tips are indicated by reference characters 31 and 32 in FIGS. 7 and 8.

Openings 22, 23 and 24 are positioned behind threaded openings 33, 34 and 35. Either a closure screw 36 or a closure plug 37 may be inserted in openings 33, 34 and 35. A closure plug 37 is shown screwed into threaded opening 33. Plug 37 extends into opening 22, preventing the passageway of sulphur through opening 22 and tangential passageway 25. A closure screw 36 is positioned in threaded opening 34 to permit the passage of sulphur through opening 23 and passageway 26. In this way, the nozzle may operate at two-thirds capacity. In order to operate at full capacity closure plug 37 would be replaced with a closure screw 36. Similarly, for the nozzle to operate at one-third capacity one of the closure screws 36 would be replaced with a closure plug 37.

The fine spray resulting from the use of the nozzle of the present invention is believed to result from the combination of the diversion cone and the tangential passageways which lead the molten sulphur into swirl chamber 28. This swirling action just upstream of the nozzle tip 17 results in an atomization of the molten sulphur as it exits nozzle tip 17.

The nozzle tip is removable and replaceable and nozzle tip openings of different sizes may be used. The preferable nozzle tip opening size depends upon the pressure of the molten sulphur available at the tip. This pressure in turn depends upon the size of the sulphur pump as well as the configuration of the piping leading up to the nozzle. Although dependent on many factors production from a single nozzle of the type described herein would be expected to be from 400 to 500 tons per 24 hours.

A very important feature of the present invention is the ability of the nozzle to be protected by a steam jacket. Ring 14 extends outwardly from cylindrical side 11 and permits a steam jacket 15 to be welded to the ring. In this way the majority of the body of the nozzle is surrounded by steam or other heat transfer medium which provides cooling during down times or sulphur burning, and warming during the start up period. The steam jacket is preferably welded to ring 14. Another advantage of the sulphur gun of the present invention is the provision of a plurality of openings and even if one of the openings becomes plugged the gun may still be operated.

While the nozzle in the drawings is shown with three openings, 22, 23 and 24, the nozzle may alternatively have two openings or four or more openings. The maximum practical number is believed to be six, depending on plant and nozzle size.

A nozzle similar to that shown in the drawings was fabricated from alloy 20 stainless steel and had a cylindrical outside diameter of three inches and a length from base to the face of the ring of 2 11/16ths inches. The diffusion chamber extended a length of $\frac{3}{4}$ of an inch beginning $\frac{1}{2}$ inch from the rear face of the nozzle. The diversion cone has an angle of about 150 degrees. The openings 22, 23 and 24 have a diameter of 7/16ths of an inch and are positioned with their centers on a radius of one inch from the axis of the nozzle. The tangential passageways have a diameter of 5/16ths of an inch and the swirl chamber has a radius of about $\frac{7}{8}$ths of an inch and extends about 3/16ths of an inch below the lower edge of the passageways. The threaded opening for receiving the nozzle tip has a thread size of one inch and nozzle tip opening sizes of $\frac{3}{8}$ths inch, 7/16th inch and $\frac{1}{2}$ inch were used. The tip 14 extended $\frac{3}{8}$ths of an inch beyond the face of the nozzle and $\frac{1}{4}$ of an inch beyond the cylindrical outside edge of the nozzle body.

The present embodiments of this invention are thus to be considered in all aspects as illustrative and not restrictive, the scope of the invention being indicated by the appended claims rather than by the foregoing description. All changes which come within the meaning and range of equivalency of the claims therefore are intended to be embraced therein.

I claim:

1. A nozzle for spraying molten sulphur, said nozzle comprising:
   a generally cylindrical body having a threaded axial bore for introducing molten sulphur into said nozzle;
   a diffusion chamber adjacent said threaded axial bore;
   a diversion cone positioned along the axis of said nozzle adjacent said diffusion chamber;
   at least two openings passing through said diversion cone having an entryway adjacent said diffusion chamber;
   at least two tangential passageways connecting said openings with a swirl chamber and positioned tangentially with respect to the swirl chamber;
   at least one threaded hole positioned with its axis parallel to the axis of the nozzle and in line with at least one of said openings and positioned so that the axis of the threaded hole intersects the axis of at least one of said tangential passageways;
   means for closing said threaded hole;
   a circular swirl chamber adjacent said diversion cone;
   a nozzle tip positioned axially of said nozzle and adjacent said swirl chamber; and
   an exterior steam chamber extending a majority of the length of the nozzle.

2. The nozzle of claim 1 wherein said means for closing said threaded hole comprises a threaded screw having a length equal to the length of the threaded hole.

3. The nozzle of claim 1 wherein said means for closing said threaded hole comprises a threaded screw having a cylindrical extension having about the same outside diameter as the inside diameter of said opening and sufficient in length so that when said threaded screw is screwed into said threaded hole the cylindrical extension extends into said opening.

4. The nozzle of claim 1 wherein there are three of said openings.

5. The nozzle of claim 1 further including a protective ring extending beyond the forward face of the nozzle.

6. The nozzle of claim 1 further including a protective ring extending outwardly beyond the cylindrical edge of the body of said nozzle to provide a steam jacket chamber along the length of the nozzle.

7. The nozzle of claim 1 further including interchangeable nozzle tips.

8. The nozzle of claim 1 wherein the said conical diversion cone has a hemispherical depression positioned adjacent said nozzle tip.

* * * * *